Aug. 17, 1937.     D. BUSBY     2,089,943
FLUID VALVE
Filed Oct. 16, 1935
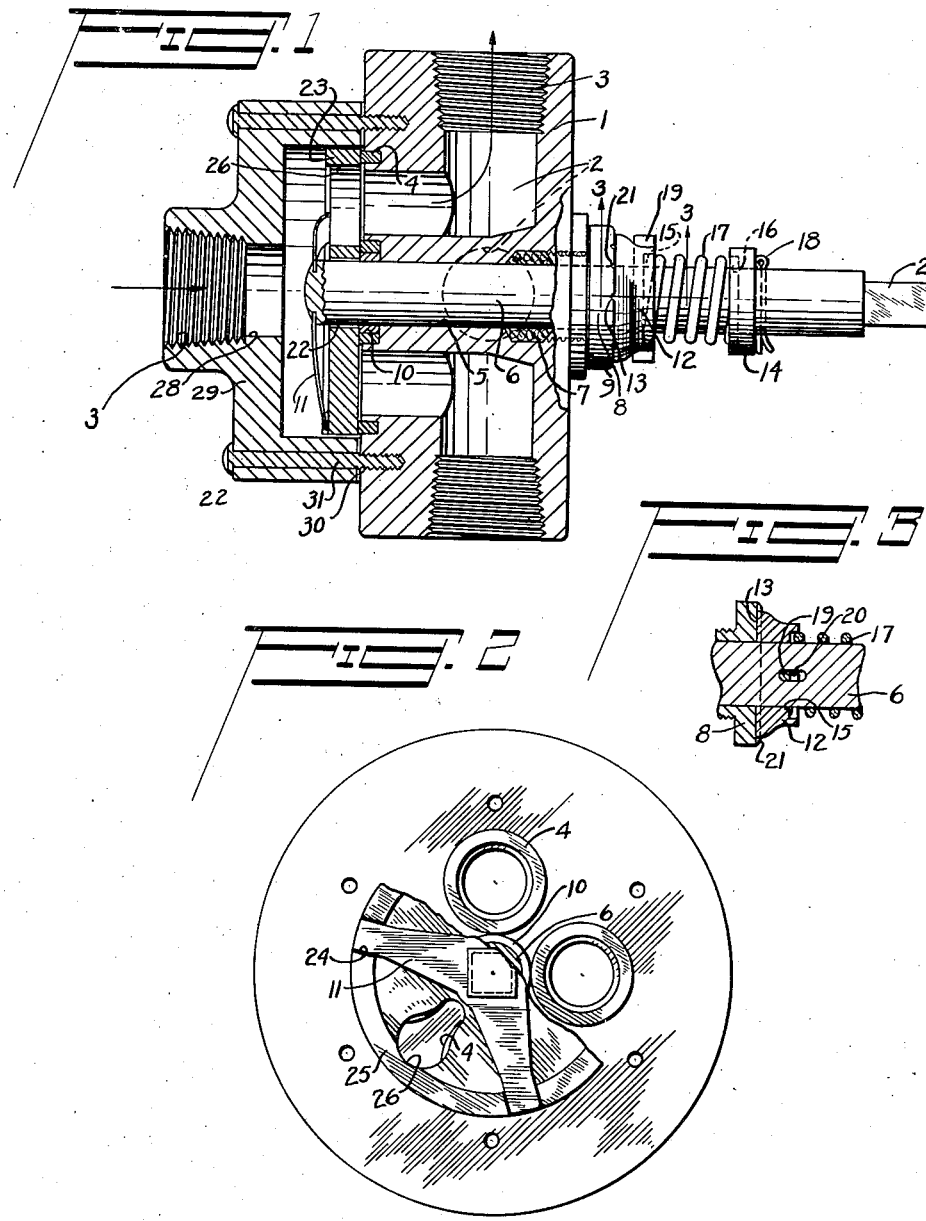
INVENTOR
DANIEL BUSBY
BY
ATTORNEYS Patented Aug. 17, 1937

2,089,943

UNITED STATES PATENT OFFICE 2,089,943

FLUID VALVE

Daniel Busby, Seattle, Wash.

Application October 16, 1935, Serial No. 45,263

1 Claim. (Cl. 251—90)

(Granted under the act of March 3, 1883, as amended April 30, 1928; 370 O. G. 757)

The invention described herein may be manufactured and used by or for the Government for governmental purposes, without the payment to me of any royalty thereon.

My invention relates to a new type of fluid valve.

It has been the custom of the aircraft industry to employ cork seated fuel and oil valves in connection with power plant installations. While this type of valve may be generally relied upon not to leak under severe conditions of strain and vibration, there is a further condition under which serious difficulty is experienced.

With the advent of multi-engined power plants, necessity arose for remote control of fuel and oil valves. This control is accomplished by a system of rods, universal joints, gears, or equivalent, interconnecting one or more fluid valves with a master control handle located within ready access of the aircraft pilot. Due to the considerable distance between valves and handle, to the many bends and angles of the aircraft structure which must furnish rod support, and to the total friction of rod bearings, joints, gears, or equivalent, much initial backlash and friction is experienced prior to actual turning of the fluid valve proper. When the above is combined with the high degree of friction ever present in cork seated fluid valves, serious operating difficulties arise during flight.

It is an object of my invention to provide low operating torque characteristics in a valve which may be depended upon not to leak under the most severe conditions of strain and vibration.

With the foregoing and other objects in view, which will appear as the description proceeds, the invention consists of certain new and novel improvements in fluid valves, which will be hereinafter more fully illustrated and described in the accompanying drawing and more particularly pointed out in the appended claim.

Referring to the drawing, in which numerals of like character designate similar parts throughout the specification.

Fig. 1 is a side elevation, in partial cross-section, of my invention.

Fig. 2 is an end view of my invention with disc cover removed.

Fig. 3 is a sectional view taken on the lines 3—3 of Fig. 1.

In Fig. 1, a valve body 1 is provided with four symmetrically spaced port holes 2. The outer extremities of the port holes 2 are provided with conventional pipe threads 3, while the inner extremities thereof are surrounded by counter-sunk annular bushings 4 of semi-plastic bronze or other suitable soft metal. A bearing 5 is provided on the longitudinal centerline of the valve body 1 for supporting a shaft 6. The outer end of the bearing 5 is provided with a packing gland 7, a gland collar 8 and collar check nut 9, while the inner end thereof terminates in a counter-sunk bushing 10 of material similar to the bushings 4. A slightly domed three-legged spring 11 is fixed to the inner extremity of the shaft 6 by peening over a squared end thereof. The other extremity of the shaft 6 is provided with an inner collar 12, having an oppositely disposed pair of engaging projections 13, and an outer collar 14. It will be noted that the collars 12 and 14 are provided with counter-bores 15 and 16, for housing the end portions of a spring 17. A cotter pin 18 limits outward movement of the collar 14, while a recessed pin 19 and slotted hole 20 limit inward movement of the collar 12 and at the same time permits sufficient outward movement thereof to free projections 13 from a symmetrically placed series of grooves 21 provided in the gland collar 8. The recess in the pin 19 is identical in depth and width to the depth and outer diameter of the counter-bore 15, thus preventing loss of the pin 19 as long as the inner end of the spring 17 engages the recessed portion thereof.

Fig. 3 gives an end view of the hole 20, with the pin 19 seated against the inner end of the slot thereof, and also shows seating of the spring 17 in the counter-bore 15.

Prior to assembly of the shaft 6 within the bearing 5, the free end thereof is inserted in a slightly oversized hole 22 of a selector disc 23 such that three equi-spaced radial slots 24 provided in an annular shoulder 25 of the selector disc 23 are engaged by the outer tips of the domed spring 11, the three prongs of which are adapted to snugly slidingly engage the aforesaid equi-spaced radial slots for maintaining the disc in yielding engagement with the bushings 4 and for establishing positive driving connection between the shaft 6 and the disc 23. Joint reference to Fig. 2 indicates that the selector disc 23 is provided with a single selector opening 26. The selector disc 23 is designed to fit relatively loosely upon the shaft 6 in order that its ground and polished inner surface may be "self-seating" or "aligning" upon the smooth outer surfaces of the bushings 4 and 10. The disc 23, by reason of the oversized hole 22 (which permits limited movement of the disc in all directions radially of the shaft 6) and the centering action of the domed spring 11, is "self-centering" with respect to the longitudinal axis of the shaft. The shaft 6 is turned by suitable means attached to a squared end 27, the selector opening 26 alternately and progressively registering "off" (as shown in Fig. 2) and "on" with each of the four annular bushings 4, upon engagement of the two projections 13 with one after another of the eight oppositely disposed pairs of grooves 21 of the gland collar 8.

The four port holes 2 function successively as valve "outlets", an "inlet" port hole 28 being provided in a body cover 29 secured to the valve body 1 by means of a gasket 30 and screws 31. The port hole 28 is provided with conventional pipe threads 3.

In operation, one or more of the assembly shown in Fig. 1 are installed as a part of each power plant of a multi-engined aircraft, one or more master control handles are installed adjacent the aircraft pilot, after which valves and handles are interconnected by suitable systems furnishing remote control. Friction between the polished surfaces of the selector disc 23 and the bushings 4 and 10 is sufficiently small to assure positive operation of the selector disc 23 with each positive registration of a master control handle.

It is evident from the above that my invention possesses not less than three outstanding features of novelty; i. e., in the combination of a selector disc provided with hardened and polished inner surface adapted to operatively engage a plurality of projecting annular bushings, provision of a soft metal seal, provision of automatic adjustment for wear and provision of low torque during selector adjustments.

I claim:

In a fluid valve having a body portion provided with a plurality of port openings, countersunk annular bushings projecting from said port openings, means for establishing selective fluid flow through said port openings comprising a disc provided with a central shaft opening and having a port adapted to selectively register with said bushings, the inner surface of said disc engaging the said bushings and the outer surface thereof being provided with an annular shoulder having not less than three equi-spaced radial slots therein, a shaft journaled to said body portion and loosely passing through said central opening, a domed-shaped spring fixedly connected to said shaft and having not less than three prongs adapted to snugly slidingly engage the aforesaid equi-spaced radial slots for maintaining said disc in yielding engagement with said bushings and for establishing positive driving connection between the shaft and the disc.

DANIEL BUSBY.